United States Patent [19]

Farge et al.

[11] Patent Number: 4,795,801

[45] Date of Patent: Jan. 3, 1989

[54] CHEMICAL GRAFTING PROCESS USED TO PRODUCE A COMPOSITION, AND COMPOSITION PRODUCED THEREBY

[76] Inventors: Herve M. J. Farge, B36 Les Nouveaux Horizons, F 78990 Elancourt; Jean M. L. Farge, 152 rue de La Gare, 95120 Ermont, both of France

[21] Appl. No.: 12,701

[22] Filed: Feb. 9, 1987

[30] Foreign Application Priority Data

Feb. 10, 1986 [FR] France .................. 86 01759

[51] Int. Cl.$^4$ .................. C08J 3/00; C08K 9/04
[52] U.S. Cl. .................. 528/392; 106/287.17; 106/287.34; 106/505; 252/186.42; 523/202; 523/203; 524/786; 524/789; 524/790; 524/853; 526/75; 526/240
[58] Field of Search .................. 523/202, 203; 524/786, 524/853, 789, 790, ; 526/75, 240; 528/392; 252/186.42; 106/287.17, 287.34, 309, 308 Q, 287.24, 308 M

[56] References Cited

U.S. PATENT DOCUMENTS

| | | |
|---|---|---|
| 3,324,074 | 6/1967 | McManimie . |
| 3,442,851 | 5/1969 | McManimie .................. 524/790 |
| 3,471,439 | 10/1969 | Bixler et al. .................. 523/202 |
| 3,503,128 | 3/1970 | Boyd et al. .................. 523/203 |
| 3,780,156 | 12/1973 | Cameron .................. 524/789 |
| 4,019,922 | 4/1977 | Whittum et al. .................. 524/853 |
| 4,129,549 | 12/1978 | Kahane .................. 524/789 |
| 4,151,154 | 4/1979 | Berger .................. 523/203 |
| 4,242,251 | 12/1980 | Aishima et al. .................. 523/202 |
| 4,251,576 | 2/1981 | Osborn .................. 524/786 |
| 4,442,240 | 4/1984 | Suh .................. 523/202 |
| 4,678,819 | 7/1987 | Sasaki .................. 523/203 |

FOREIGN PATENT DOCUMENTS

| | | |
|---|---|---|
| 0018558 | 11/1980 | European Pat. Off. . |
| 1399049 | 4/1965 | France . |
| 0025050 | 7/1973 | Japan .................. 524/853 |
| 0104621 | 9/1978 | Japan .................. 524/786 |
| 0167743 | 12/1981 | Japan .................. 523/202 |
| 0016007 | 1/1982 | Japan .................. 523/202 |
| 0127725 | 7/1984 | Japan .................. 523/202 |
| 2090602 | 7/1982 | United Kingdom . |

*Primary Examiner*—Herbert J. Lilling
*Attorney, Agent, or Firm*—Pollock, VandeSande & Priddy

[57] ABSTRACT

The invention relates to the use of chemical grafting to produce a stable liquid composition that is capable of hardening following an optional polymerization process. Under the invention, in order to produce a composition that is liquid, at least initially and prior to any polymerization, a polymerizable organic acid comprising at least two double bonds in resonance is combined in a solvent with an inorganic filler having at least one hydroxylated group with the help of a catalyst acting as a radical upon said organic acid. By adjusting the concentration of catalyst and using a polymerizable monomer solvent, the liquid composition may be hardened by polymerization after the initial grafting reaction. By ensuring that a portion of the organic acid retains free bonds that have not combined with filler, it is also possible to induce the composition to become chemically attached to a resin or to reinforcing fibers. The invention may be applied to the production of molded objects.

7 Claims, No Drawings

CHEMICAL GRAFTING PROCESS USED TO PRODUCE A COMPOSITION, AND COMPOSITION PRODUCED THEREBY

The present invention concerns a process for using chemical grafting to produce a stable liquid composition capable, under certain conditions, of hardening following an optional polymerization process.

In other words, the process of the invention makes it possible to employ a number of selected products and a special implementing procedure to dissociate and control the processes of chemical grafting and polymerization by performing said chemical grafting prior to any polymerization that may be performed.

The process of the invention makes it possible to produce:
either a stable liquid composition, polymerizable but not yet polymerized;
or a solid, polymerized composition obtained by polymerizing the aforesaid liquid composition.

Under the invention, the polymerizing composition will retain available bonding points, (i.e., vacant bonds on some of its constituent atoms). At said points:
a resin may become chemically attached, after polymerization, so as to form, for example, a gel coat; or
reinforcing fibers may, through impregnation during the polymerization process, come to adhere chemically, thus forming a composite structure.

A "gel coat" will be understood to mean a thin film that, after being sprayed into a mold and assuming the shape thereof, is joined to a backing with which it bonds.

BACKGROUND OF THE INVENTION

The field of art of the present invention, as represented, for example, by documents FR-A No. 1,399,049 (MONSANTO COMPANY) and EP-A No. 0,018,558 (BAYER AG), already includes the technique of producing polymers heavily laden with granulated minerals and to which they are grafted using a bridging or bonding agent of the organosilane type. This technique, which differs from the process of the invention, does not produce a stable, nonpolymerized, liquid composition.

Document GB-A No. 2,090,602 (MITSUBISHI RAYON CO., LTD.) discloses compositions based on mineral filler, organic acids, and polymerizable monomers dispersed in water under an inert atmosphere. However, said compositions are polymerized hot (at around 50° C.) and over long periods of time (8 hours), making possible only the direct production of reinforced polymers, i.e., directly from hardened polymerized compositions, without the possibility of separating the organic acid/mineral filler reaction from the polymerization reaction by breaking the cycle prior to any polymerization. In other words, the teachings of this patent do not enable, any more than the MONSANTO of BAYER patents, the production of a nonpolymerized liquid composition. A fortiori, no process for their production is contemplated therein.

The teachings of document FR-A No. 2,273,040 (ICI—IMPERIAL CHEMICAL INDUSTRIES, LTD.) disclose polymerizable liquid compositions that include a dispersion of particles from one or more inorganic substances in a polymerizable organic liquid. Said patent also discloses a process for producing such compositions, as well as the constituents of the latter.

It will be noted, however, that the known process in question involves the mechanical grinding of the inorganic substances in the presence of an environment made up of a liquid monomer and polymer binder.

Said known process is therefore characterized by the chemical adherence of a polymer dispersant onto the inorganic fillers, with said adherence occurring during and as a result of the mechanical grinding operation. This operation takes place over a particularly long period of time (approximately 24 hours), and requires heavy means for its execution.

Without the help of the mechanical grinding, and in the absence of the stated environment, no chemical grafting can occur.

SUMMARY OF THE INVENTION

By contrast, in accordance with demonstrations that have been made, the process of the present invention makes it possible to produce, in a much shorter period of time, either a liquid composition, which may be polymerizable, or a solid, polymerized composition. This is accomplished without recourse to polymer dispersants or heavy mechanical means such as grinding.

The process of the invention results in compositions having properties that are equivalent to or better than those already known. Furthermore, its applications are more extensive than those proposed up to the present time.

More specifically, the process used under the invention to produce a liquid composition by chemical grafting is characterized in that:
various products are selected, including at least:
one inorganic filler comprising at least one hydroxylated group
one polymerizable organic acid comprising two double bonds in resonance
a solvent
a catalyst
under given temperature conditions, these various products are put into contact, and
prior to any eventual polymerization, the organic acid is combined with the mineral filler by the radical-like action of the catalyst on said organic acid.

According to another of its characteristics, the invention further provides as follows:
said products are put into contact with each other and mixed, and
during mixing and for at least an initial period thereafter, the combination of temperature and grafting-reaction time is maintained unchanged, and the catalyst is apportioned in an appropriate manner so as to induce the grafting reaction in question without provoking the polymerization reaction.

Still according to the invention, if one wishes to make the liquid composition susceptible to hardening, one proceeds as follows:
a polymerizable monomer is used as the solvent, and
after the products that are to react have been placed into contact with each other, and following the aforementioned grafting reaction, the polymerization reaction is induced by increasing the concentration of catalyst.

Lastly, it will be noted that the process of the invention provides for the creation of free or available acid groups or bonds—for use, for example, for chemical combination with a resin—either during or after the polymerization process, through relatively precise adjustments in the proportion of organic acid.

The invention also concerns the possibly hardenable liquid composition and the hardened composition that may be obtained using all or part of the process presented above.

1—Physico-chemical description

It should first be noted that the mechanism that will be described below is suitable for organic molecules comprising a carboxyl-type acid group in association with at least one carbon-carbon double bond.

The organic acid is selected so that said double bond will be in resonance with the carbon-carbon double bond of the carboxyl group.

Among the basic products required to implement the process of the invention, in addition to the aforementioned organic acids, are at least one inorganic filler (mineral or metal) comprising at least one hydroxylated group, a solvent that may be polymerizable, and a catalyst.

According to the process of the invention, said products are brought into contact with each other, preferably by mixing them together, under certain temperature conditions. The actual grafting operation is then initiated. Before explaining the principle behind this operation, the mechanism of the reaction involved will be presented below in schematic form with the aid of an example.

Grafting mechanism

In the example selected, methacrylic acid is used as the acid.

Use is made of the fact that in the acid's structure, the C=C and C=O bonds are in resonance.

Double reactions of a radical (R):

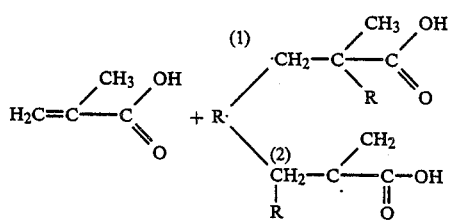

Reaction (1) results in a conventional radical-like polymerization.

Reaction (2) results in a rearrangement of the molecule, such that:

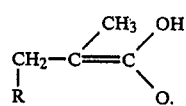

The acid radical is therefore excited and can easily react with a hydroxyl group R'OH to produce:

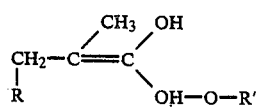

(R': radical)

which, by rearrangement, yields:

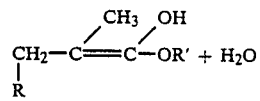

and then:

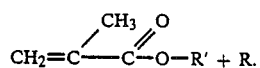

The reaction is similar to an esterification reaction but it relies on a different chemical process.

This can be shown by the absence of any polymer following the reaction, by the disappearance of the acid, and by a change in viscosity.

Explanation of the principle behind the grafting process

First, a radical obtained through thermal decomposition of the catalyst, which is of the type used to initiate a radical-like reaction (diazo- or peroxide), excites the carbon-carbon double bond. It will be noted that this reaction is of the type used in radical-like polymerizations.

Because the carbon-carbon double bond is in resonance with the carbon-oxygen double bond of the associated carboxyl group, any action on one of the double bonds will entail a reaction on the other.

As a result, the carboxyl group finds itself in an excited state, which enables it to react with any hydroxylated group. In such cases, the inorganic filler has a basic or amphoteric character.

In other words, a chemical graft is performed by attaching the organic acid to the inorganic filler through the radical-like action of the catalyst on the acid.

In known processes, the reaction between the organic acid and the inorganic filler usually competes, with respect to the order of the reaction, with the classic polymerization reaction, without any possibility of controlling the competition.

By contrast, using the process of the invention it becomes possible to dissociate the polymerization operation from the grafting operation and to have the latter occur first in the order of reaction, as well as making it easily controllable.

For this purpose, the proportion of catalyst has been adjusted with respect to the other products used, and the temperature conditions and duration of the grafting reaction have been determined and maintained in relatively strict fashion.

If, under given conditions of implementation, care has been taken to adjust the catalyst concentration so that the catalyst will be entirely consumed in the course of the acid-base reaction (inorganic filler/organic acid), said reaction will not be followed by the polymerization reaction.

The result is a nonpolymerized composition that may be stabilized by any known means.

If, however, one seeks to obtain a hardened composition from said liquid composition, it will be necessary to allow the polymerization process to occur.

In this case, care will be taken to ensure that among the base products already mentioned, the solvent as well as the organic acid will be polymerizable.

In addition, during the mixing operation, i.e., after a given period of time has elapsed from the onset of the grafting reaction between organic acid and inorganic filler, or even following the completed grafting reaction and stabilization of the liquid composition, the catalyst concentration can be increased so that all of the catalyst will not be consumed in the "acid-base" reaction (i.e., the grafting reaction), with the result that the composition will then be able to polymerize.

For one particular application made possible by an important characteristic of the invention, the concentration of carboxylated monomer (i.e., organic acid) is also adjusted as a function of the degree of advancement of the ongoing grafting operation, so that said organic acid, which in this case is polymerizable, will retain "reactive points" (i.e., vacant bonds) that do not become attached to the inorganic filler, even by the end of the grafting process. It is therefore possible, during or even after polymerization of the aforementioned composition, to produce a composition comprising free or available bonds or groups, enabling suitable complementary substances to be added by a known process of chemical adhesion.

The latter operation may be used to bond the composition to glass fibers or to an organic resin of the polyester, acrylic, or phenolic type.

It will be understood that any fiber comprising at least one hydroxylated component on its surface or in its structure may be used.

In order to reduce the newly invented process to practice, it will be understood that the active base (i.e., the grafted mineral or metal filler) must be compatible with the organic "matrix" (i.e., the polymerizable monomer solvent must be compatible with whatever carboxyl-type acid group is selected).

The polymerizable monomer may be any liquid monomer of the following types (for example): methacrylate, acrylate, urethane, vinyl, styrene, phenol, epoxy, aromatic, aliphatic, or hydroxylated.

With respect to the choice of the inorganic filler, this may be a mineral or metal pulverulent, provided, however, that its structure or surface contains hydroxylated groups that will permit the organic acid to become attached.

The organic acid or carboxylic monomer selected may come from the family of the acrylic, methacrylic, and maleic acids, or from among other acids having a polymerizable double bond compatible with the organic matrix, i.e., with the polymerizable monomer solvent.

2—Physical description

It will have been noted that the foregoing chemical process of the invention makes it possible, among other things, to perform an esterification of hydroxyl groups during the chemical grafting process.

The inorganic filler(s) used include(s) at least one hydroxylated group. It was therefore possible to attach at least one organic molecule to the mineral (or metal) filler.

Physically, this was expressed as a modification of the interface between the organic and inorganic phases, which had the effect of making the organic and inorganic phases compatible. It is this operation of "compatibilization" that has been called "chemical grafting."

Still from the physical point of view, said compatibilization took concrete form in an especially pronounced drop in viscosity, moving in some cases from more than 50 poises to less than 3 poises. The resulting composition is particularly fluid, given the high proportion of the mineral phase, which may be as much as approximately 93 parts filler to approximately 7 parts organic phase, by weight.

As previously noted, if both a polymerizable organic acid and a polymerizable solvent were used, and if the various products were appropriately proportioned (particularly) the organic acid and the catalyst), it would be possible, in a stage subsequent to grafting, to allow polymerization to occur. Depending on the application desired, polymerization may occur in fine layers or in mass, and may be done hot or cold. Polymerization in layers is considered to involve thicknesses of less than approximately 1 mm.

Reference has also been made to the possibility of producing (again, through the use of an appropriate proportion of carboxylic acid) a composition having free acid groups or bonds onto which resin or fibers may be made to adhere chemically.

In more precise physical terms, by causing reinforcing fibers to adhere at these available bonding points through impregnation during the polymerization process, it is possible to produce a very hard "composite" with high mechanical resistance.

Causing a polyester, acrylic, or even phenolic resin to adhere superficially following the polymerization process will result in a gel coat of good appearance and high surface hardness.

It would also be possible to use the hardened composition of the invention as the basis for a composite structure covered with a gel coat.

Generally, the hardened compositions obtained using the process of the invention show high mechanical resistance characteristics. Tests indicate a 11,500 MPa modulus of elasticity in flexure, a 90 MPa modulus of rupture in flexure, and a Taber scratch resistance equivalent to that of melamine resin coatings.

Furthermore, the composite structures that can be produced after polymerization have mechanical and surface hardness characteristics that are considerably greater than those of presently known composite materials. In fact, because the composition of the invention is very fluid prior to polymerization, it serves easily as a matrix in impregnating reinforcing fibers.

To use the compositions described above, various techniques such as molding, injection, or spraying are possible.

The field of use and possible applications of the compositions are multiple and of substantial industrial value.

Sprayed or poured in thin layers, it is possible to produce a gel coat or paints of great hardness.

By impregnating reinforcing fibers (such as glass fibers), it is possible to produce very light and rapid "composites" that can be polymerized hot or cold. Said composites may be used by contact, injection, or any other known process.

When solid cast, the composition of the invention is capable of producing very fine moldings. Because it does not adhere to glass, it can be molded between two glass surfaces, producing strong plates of good appearance.

In this way it is possible, for example, to produce building products such as sidings, roofings, bathroom fixtures, floor and wall coverings, facings for prefabricated sections of hydraulic concrete, or facings for "sandwich" panels molded to shape, etc.

By using as the mineral filler granulates or powders such as powder of marble or of other rocks, it is possible to produce synthetic marble or reconstituted stone useful for roofing or siding, or for slating.

By using mineral products that are readily available near the site at which the invention is to be used, such as laterite and other aluminum oxide derivatives, it is possible to produce high-performance materials for use in construction in developing countries.

By way of nonlimitative example, a number of tests involving the process of the invention will now be described.

EXAMPLE 1

Approximately 70 grams of silica powder (such as FARCIL 44, registered trademark of Société SANSON), 25 grams of methyl methacrylate, and 5 grams of methacrylic acid are mixed together. The mixture is heated to a temperature of about 60° C., and approximately 5 mg of catalyst (such as benzoyl peroxide) are then added. After approximately 10 to 30 minutes, a spectacular drop in viscosity will be observed. The mixture is then cooled and stabilized with approximately 0.1 mg of hydroquinone. The resulting compound is a nonpolymerized liquid.

EXAMPLE 2

The same composition is prepared as in example 1, except that the silica is replaced with pulverulent aluminum oxide in a form susceptible to hydration. The resulting composition is again catalyzed using approximately 1 gram of benzoyl peroxide accelerated with approximately 0.2 g of dimethyl-paratoluidine. Approximately 0.1 g of paraffin with a melting point of approximately 58° C. is then added. The composition is then spread on a glass surface and polymerized. The result is a hard white film of good appearance.

EXAMPLE 3

About 80 grams of powdered aluminum are mixed with 15 grams of methyl methacrylate and 4.5 grams of methacrylic acid. The mixture is heated to a temperature of approximately 60° C. and 6 mg of catalyst (e.g., benzoyl peroxide or an azo catalyst) are added.

After approximately 30 minutes, the mixture becomes fluid. It is then cooled and stabilized with approximately 0.1 mg of hydroquinone. The resulting composition is a liquid and has not yet polymerized. It is then catalyzed once more, as in example 2. The product obtained after polymerization is hard. It might also be noted that it conducts electricity.

EXAMPLE 4

A composition similar to that used in example 2 is prepared. Used to impregnate glass fibers, the composition yields a hard polymerized product of good surface appearance and high impact resistance.

We claim:

1. A process for making a moldable, composition comprising a suspension of particles in a liquid, said process comprising:
   I. mixing together:
      (a) an inorganic filler comprising at least one hydroxylated group;
      (b) a polymerizable organic acid comprising a group having the formula

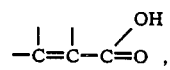

(c) a liquid which is a solvent for said organic acid and is capable of suspending said inorganic filler; and
   (d) a consumable, radical-forming catalyst, said catalyst, upon decomposition, forming at least one radical for reacting with said organic acid to form an excited acid radical, the amount of said catalyst in said mixture being restricted so as to be substantially entirely consumed during said acid radical-forming reaction; and,
   II. heating the resulting mixture to a temperature at which said catalyst decomposes to form said radicals for reaction with said organic acid and thereby induce a reaction in which said organic acid and said inorganic filler chemically combine and produce a decrease in viscosity of said mixture.

2. A process in accordance with claim 1 wherein said solvent comprises a polymerizable monomer, and after said excited acid radical and said inorganic filler have combined, providing additional catalyst in said mixture, thereby inducing polymerization of said liquid composition.

3. A process in accordance with claim 2 wherein the amount of organic acid provided in the composition is greater than the amount needed to combine with said inorganic filler, thereby obtaining a mixture in which a portion of the organic acid possesses residual free bonds.

4. A process in accordance with claim 3 which includes a step of impregnating reinforcing fibers with the polymerizable composition.

5. A process in accordance with claim 3 which includes a step of bringing a resin into contact with said organic acid whereby said resin is chemically attached to residual free bonds of said organic acid.

6. A nonpolymer liquid molding composition formed by the process of claim 1.

7. A composition in accordance with claim 6 in which the amount of said organic acid is selected so that, upon reaction of acid radicals with said inorganic filler, said organic acid contains substantially no unattached free bonds.

* * * * *

UNITED STATES PATENT AND TRADEMARK OFFICE
CERTIFICATE OF CORRECTION

PATENT NO. : 4,795,801
DATED : January 3, 1989
INVENTOR(S) : Herve Farge, et al.

It is certified that error appears in the above-identified patent and that said Letters Patent is hereby corrected as shown below:

Column 1, line 61, change "of BAYER" to --or BAYER--.

Column 3, line 16, change "carbon-carbon" to --carbon-oxygen--.

Column 3, line 45, change the radical "-$CH_2$" to -- -$CH_3$--.

Column 6, line 8, before "the" delete ")".

Column 6, line 53, change "rapid" to --rigid--.

Signed and Sealed this

Sixth Day of June, 1989

Attest:

DONALD J. QUIGG

Attesting Officer

Commissioner of Patents and Trademarks